US011949239B2

(12) United States Patent
Mousavi et al.

(10) Patent No.: US 11,949,239 B2
(45) Date of Patent: Apr. 2, 2024

(54) TECHNOLOGIES FOR SOLAR POWER SYSTEM PERFORMANCE MODEL TUNING

(71) Applicant: ABB Schweiz AG, Baden (CH)

(72) Inventors: Mirrasoul J. Mousavi, Cary, NC (US);
Mithun P. Acharya, Cary, NC (US);
Karen J. Smiley, Raleigh, NC (US)

(73) Assignees: Hitachi Energy Switzerland AG, Baden (CH); ABB Schweiz AG, Baden (CH)

( * ) Notice: Subject to any disclaimer, the term of this patent is extended or adjusted under 35 U.S.C. 154(b) by 470 days.

(21) Appl. No.: 17/257,777

(22) PCT Filed: Jul. 4, 2019

(86) PCT No.: PCT/US2019/040663
§ 371 (c)(1),
(2) Date: Jan. 4, 2021

(87) PCT Pub. No.: WO2020/010290
PCT Pub. Date: Jan. 9, 2020

(65) Prior Publication Data
US 2022/0131382 A1  Apr. 28, 2022

Related U.S. Application Data

(60) Provisional application No. 62/694,340, filed on Jul. 5, 2018, provisional application No. 62/694,434, filed on Jul. 5, 2018.

(51) Int. Cl.
*H02J 3/38*  (2006.01)
*G05B 19/042*  (2006.01)
(Continued)

(52) U.S. Cl.
CPC ............ *H02J 3/381* (2013.01); *G05B 19/042* (2013.01); *H02J 3/004* (2020.01);
(Continued)

(58) Field of Classification Search
CPC ...... H02J 3/381; H02J 3/004; H02J 13/00002; H02J 2203/20; H02J 2300/26;
(Continued)

(56) References Cited

U.S. PATENT DOCUMENTS 6,433,522 B1  8/2002  Siri
8,401,706 B2  3/2013  Moore et al.
(Continued)

FOREIGN PATENT DOCUMENTS

| CN | 105144530 A | 12/2015 |
|----|-------------|---------|
| DE | 102010061278 A1 | 6/2012 |
| EP | 2249457 A1 | 11/2010 |

OTHER PUBLICATIONS

International Search Report for PCT/US19/40663 dated Oct. 8, 2019, 3 pages.
(Continued)

*Primary Examiner* — Ziaul Karim
(74) *Attorney, Agent, or Firm* — Armstrong Teasdale LLP (57) ABSTRACT

Technologies for solar power system performance model tuning are disclosed. In at least one illustrative embodiment, a method of tuning a system performance model for a power plant may comprise estimating an expected output of an inverter of the power plant using the system performance model, obtaining a measured output of the inverter, determining whether a difference between the expected and measured inverter outputs is within a predefined range, and tuning the system performance model using the difference in response to determining that the difference is within the predefined range. The power plant may further comprise at least one solar panel array, and the inverter may be electrically coupled to the at least one solar panel array.

24 Claims, 8 Drawing Sheets

(51) Int. Cl.
*H02J 3/00* (2006.01)
*H02J 13/00* (2006.01)

(52) U.S. Cl.
CPC .............................. *H02J 13/00002* (2020.01); *G05B 2219/2639* (2013.01); *H02J 2203/20* (2020.01); *H02J 2300/26* (2020.01)

(58) Field of Classification Search
CPC . G05B 19/042; G05B 2219/2639; G05F 1/67; Y02E 10/56; H02M 7/48
See application file for complete search history.

(56) References Cited

U.S. PATENT DOCUMENTS

| | | | | |
|---|---|---|---|---|
| 10,958,211 | B1* | 3/2021 | Sarwat | H02J 3/004 |
| 2006/0132102 | A1 | 6/2006 | Harvey | |
| 2011/0276269 | A1 | 11/2011 | Hummel | |
| 2012/0301427 | A1 | 11/2012 | Bridger et al. | |
| 2012/0310427 | A1 | 12/2012 | Williams et al. | |
| 2014/0207437 | A1* | 7/2014 | Hoff | H02J 3/004 |
| | | | | 703/18 |
| 2015/0012258 | A1 | 1/2015 | Caine | |
| 2015/0188415 | A1 | 7/2015 | Abido | |
| 2017/0271912 | A1* | 9/2017 | Bhowmik | H02S 40/32 |
| 2017/0279376 | A1 | 9/2017 | Siri | |
| 2017/0338659 | A1 | 11/2017 | Bhowmik et al. | |
| 2017/0366010 | A1 | 12/2017 | Chen et al. | |
| 2018/0159467 | A1* | 6/2018 | Hoff | G06F 30/00 |
| 2019/0095559 | A1* | 3/2019 | Hoff | G01W 1/12 |

OTHER PUBLICATIONS

Written Opinion of the International Searching Authority for PCT/US19/40663 dated Oct. 8, 2019, 5 pages.
Extended European Search Report issued in EP Application No. 19830967.6, dated Feb. 9, 2022, 7 pages.
Mokri et al., "PV System Performance Assessment", www.sunspec.org, Jun. 2014, 28 pages.
'Using Renewables to Operate a Low-Carbon Grid: Demonstration of Advanced Reliability Services from a Utility-Scale Solar PV Plant, 66 pages.
Gevorgian et al., "Advanced Grid-Friendly Controls Demonstration Project for Utility-Scale PV Power Plants", Jan. 2016, 102 pages.
Chinese Office Action for Chinese Patent Application No. 201980045120.4, dated Dec. 29, 2023, 10 pps.

* cited by examiner

TECHNOLOGIES FOR SOLAR POWER SYSTEM PERFORMANCE MODEL TUNING

CROSS-REFERENCE TO RELATED APPLICATIONS

This application is a U.S. national stage entry of PCT International Patent Application No. PCT/US2019/040663, filed Jul. 4, 2019, which claims the benefit of and priority to U.S. Provisional Patent Application Nos. 62/694,340 and 62/694,434, each filed Jul. 5, 2018, the entire disclosures of which are incorporated by reference herein.

TECHNICAL FIELD

The present disclosure relates, generally, to electrical power systems and, more particularly, to technologies for connecting the electrical output of solar photovoltaics (PV) to a utility power grid.

BACKGROUND

Smart inverters used in solar power generation may be programmed to provide ancillary services including voltage and frequency regulation, power factor correction, and reactive power control. These advanced functionalities may help stabilize the power system and smooth out rapid fluctuations in supply and demand that result from intermittent solar irradiation and flexible loads. Grid services may be mandated across the world to enable high penetration of distributed energy resources (DERs) including solar photovoltaics (PV).

Plant level generation forecast models have been developed to predict plant output for investment planning and long-term forecasting based on historical measurements. However, unlike conventional power generation (e.g., coal, gas, nuclear, or hydro), an input (i.e., solar irradiance) required for solar photovoltaics (PV) cells (i.e., solar panel arrays) is intermittent and weather dependent. Existing prediction models may not account for many uncertainties in weather parameters and plant performance for operation or degradation of the models over time as the physical system ages.

SUMMARY

According to one aspect of the present disclosure, a method of tuning a system performance model for a power plant may comprise estimating an expected output of an inverter of the power plant using the system performance model, obtaining a measured output of the inverter, determining whether a difference between the expected and measured inverter outputs is within a predefined range, and tuning the system performance model using the difference in response to determining that the difference is within the predefined range. The power plant may further comprise at least one solar panel array, and the inverter may be electrically coupled to the at least one solar panel array.

In some embodiments, the system performance model for the power plant may comprise (i) an array performance model characterizing the at least one solar panel array and (ii) an inverter performance model characterizing the inverter.

In some embodiments, estimating the expected output of the inverter using the system performance model may comprise estimating the expected output of the inverter using the inverter performance model.

In some embodiments, the method may further comprise estimating an expected output of the at least one solar panel array using the array performance model.

In some embodiments, estimating the expected output of the inverter may comprise estimating the expected output of the inverter using the expected output of the at least one solar panel array as an input to the inverter performance model.

In some embodiments, the steps of estimating the expected outputs of the at least one solar panel array and of the inverter may be performed in response to determining that the inverter is not operating in a maximum power point tracking (MPPT) mode.

In some embodiments, the method may further comprise obtaining a measured output of the at least one solar panel array.

In some embodiments, estimating the expected output of the inverter may comprise estimating the expected output of the inverter using the measured output of the at least one solar panel array as an input to the inverter performance model.

In some embodiments, the steps of obtaining the measured output of the at least one solar panel array and estimating the expected output of the inverter may be performed in response to determining that the inverter is operating in a maximum power point tracking (MPPT) mode.

In some embodiments, the measured output of the at least one solar panel array may be obtained in real-time.

In some embodiments, the measured output of the at least one solar panel array may be obtained without taking the at least one solar panel array off-line.

In some embodiments, the measured output of the inverter may be obtained in real-time.

In some embodiments, the measured output of the inverter may be obtained without taking the inverter off-line.

In some embodiments, the method may further comprise tuning the system performance model using default parameters prior to obtaining any measured output.

In some embodiments, the array performance model may be a validated model that relates solar irradiance to expected power output of the at least one solar panel array.

In some embodiments, the inverter performance model may relate direct current (DC) inputs of the inverter to expected alternating current (AC) outputs of the inverter.

In some embodiments, the system performance model for the power plant may further comprise a site compensation model characterizing local losses associated with the power plant.

In some embodiments, the difference between the expected and measured inverter outputs may be smoothed prior to being used to tune the system performance model.

In some embodiments, tuning the system performance model may comprise comparing the system performance model for the power plant to another system performance model for another power plant.

In some embodiments, tuning the system performance model may compensate for degradation of the system performance model over time and incrementally adjust parameters of the system performance model to represent actual performance characteristics of the power plant.

In some embodiments, tuning the system performance model may comprise updating a Key Performance Indicator (KPI) for the power plant.

In some embodiments, the KPI may be at least one of a power performance index (PPI), an energy performance index (EPI), a baseline power performance index (BPPI), and a baseline energy performance index (EPI).

In some embodiments, the method may further comprise transmitting an alert signal to a system operator in response to determining that the difference is not within the predefined range.

In some embodiments, the method may further comprise performing a diagnostic analysis of the power plant in response to determining that the difference is not within the predefined range.

In some embodiments, the method may further comprise transmitting a result of the diagnostic analysis of the power plant to a system operator.

According to another aspect of the present disclosure, one or more computer-readable media may store a plurality of instructions that, when executed by a power controller operatively connected to (i) at least one solar panel array and (ii) an inverter electrically coupled to the at least one solar panel array, cause the power controller to perform any of the methods described above and throughout this disclosure.

According to yet another aspect of the present disclosure, a power controller may be configured to perform any of the methods described above and throughout this disclosure. In some embodiments, the power controller may be operatively connected to (i) at least one solar panel array and (ii) an inverter electrically coupled to the at least one solar panel array. In some embodiments, the power controller, the at least one solar panel array, and the inverter may be incorporated in a power plant.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. The detailed description particularly refers to the accompanying figures in which.

DETAILED DESCRIPTION OF THE DRAWINGS

While the concepts of the present disclosure are susceptible to various modifications and alternative forms, specific embodiments thereof have been shown by way of example in the figures and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory computer-readable storage medium, which may be read and executed by one or more processors. A computer-readable storage medium may be embodied as any storage device, mechanism, or other physical structure for storing or transmitting information in a form readable by a computing device (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
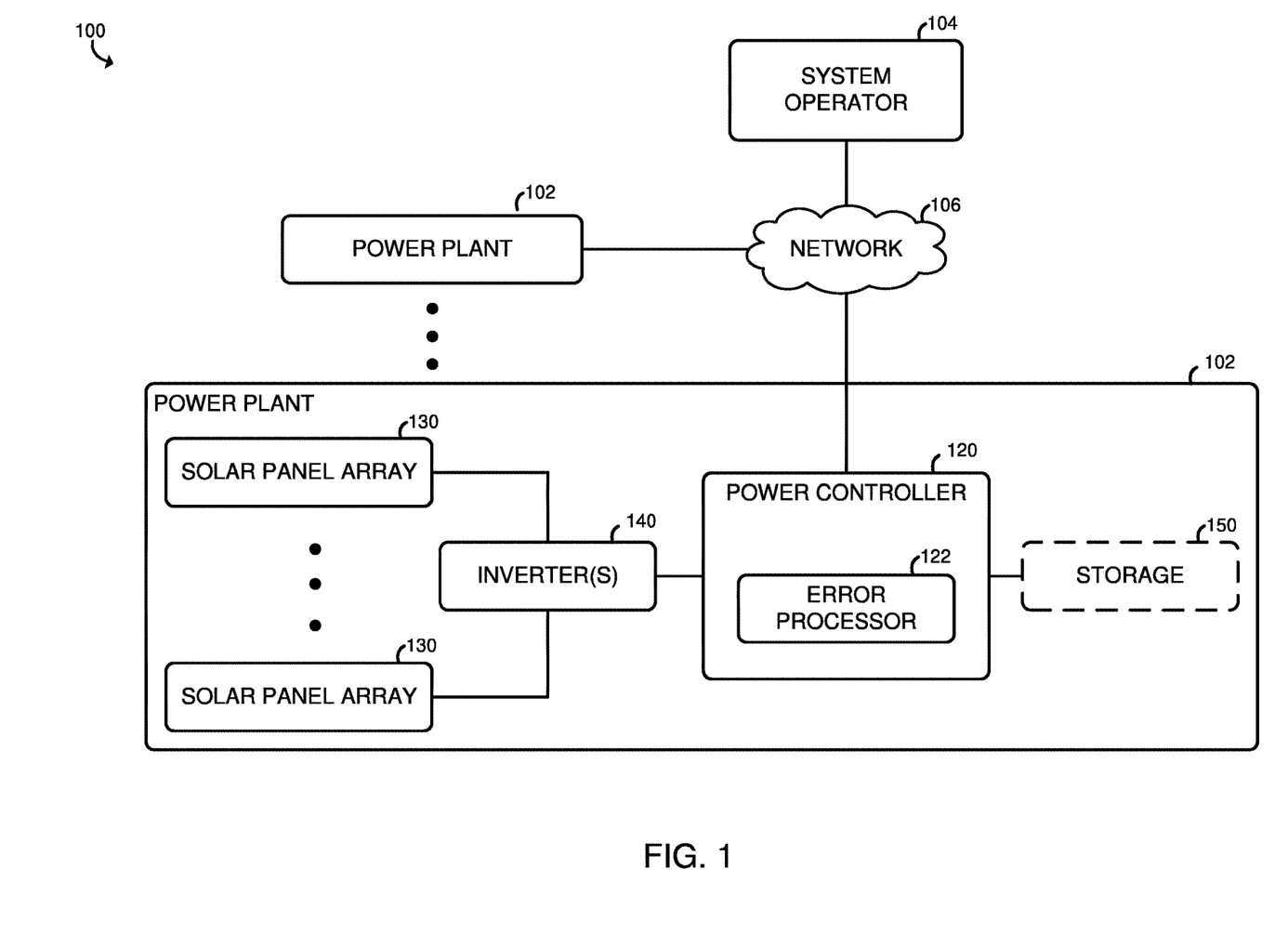
FIG. 1 is a simplified block diagram of at least one embodiment of a power system including a solar power plant and a system operator.

Referring now to FIG. 1, a power system 100 for field-based power system performance model calibration, maintenance, and tuning based on real-time field measurements to maintain a target performance of a power plant 102 includes the power plant 102 that is communicatively coupled to a system operator 104 via a network 106. The power plant 102 may be a large power plant or aggregated small residential or commercial photovoltaics (PV) resources (e.g., solar panel arrays 130).

Figure 2:
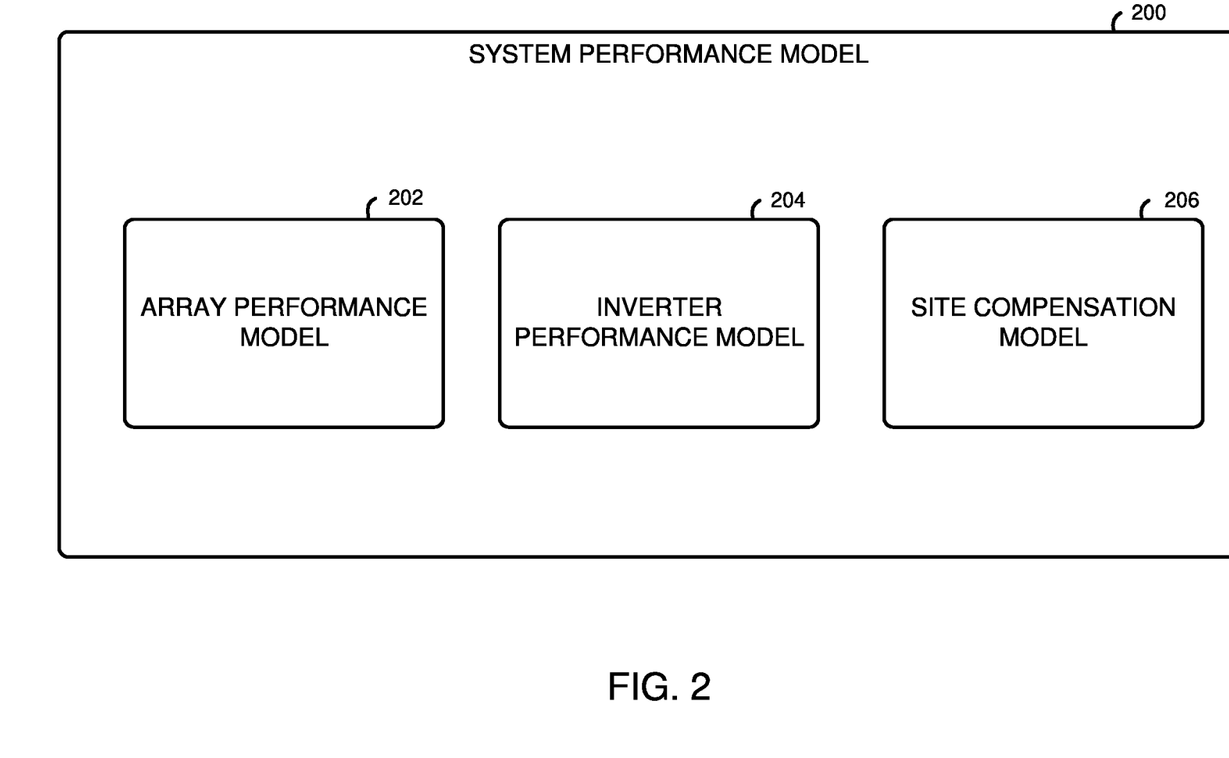
FIG. 2 is a simplified block diagram of at least one embodiment of a system performance model for determining output power of the power plant of FIG. 1.

Solar energy modeling is used for predictive maintenance and performance assessment of the solar power system 100 over its lifetime. In the illustrative embodiment, a system performance model 200 is periodically or continually updated based on real-time field measurements to compensate for model degradation that may occur over the life time of the solar power plant 102, as described further below. Such a system performance model may be used to enable operational planning and market participation for a grid-tied PV system 100. For example, the system performance model 200 may be used to characterize and track real-time and long-term performance of the power plant 102, initiate preventive and predictive maintenance, and/or determine the future value of PV generation projects, which may be expressed as a predicted power yield. As described further below, the power controller 120 is configured to perform power system performance model tuning and maintenance based on real-time field measurements without taking the system out of service for calibration tests using machine learning techniques and/or reinforcement learning techniques.

The interaction between the power plant 102 and the system operator 104 may be direct (e.g., for solar farms) or indirect through a third-party aggregator (e.g. for residential solar panels). The third-party aggregator may utilize DERMS (Distributed Energy Resource Management System), commercially available from ABB, Inc. The DERMS is a system for managing and orchestrating the performance of a large number of individual solar generators and other distributed resources. In the absence of a system operator or a link to the system operator, the DERMS receives site capability data and issues coordinated set points for grid support.

The power plant 102 includes a power controller 120 that is operatively connected to one or more solar panel arrays 130 via one or more inverters 140. For example, in the illustrative embodiment, the inverter 140 is embodied as a direct current (DC) to alternating current (AC) (DAC) converter 140. The power controller 120 is further communicatively coupled to the system operator 104. The DAC converter 140 is used in solar power generation and may be programmed to provide ancillary services, such as, for example, voltage and frequency regulation, power factor correction, and reactive power control. Such a DAC converter 140 may help stabilize the power system 100 and compensate rapid fluctuations in supply and demand that result from intermittent renewable resources.

In the illustrative embodiment, the power plant 102 may operate in a maximum power point tracking (MPPT) mode or a non-MPPT mode. In the MPPT mode, the power plant 102 is configured to maintain a maximum power point (MPP) at which the highest efficiency of the power transfer from the solar panel arrays 130 is achieved. In other words, the power plant 102 in the MPPT mode is adapted to output its maximum power extraction under all conditions (i.e., the peak power). For example, in a grid connected PV system, the MPPT in a grid connected PV system may attempt to operate the inverter 140 at its maximum power point. In other words, the inverter 140 is set to provide maximum active power output under the unity or constant power factor by the MPPT.

In non-MPPT mode, the power plant 102 is set to produce output power that is curtailed by a fraction (e.g., 10%) of its rated or estimated capacity (i.e., available peak power, or APP) in order to provide headroom for on-demand up-regulation. As discussed above, in the PV system, the APP fluctuates based on numerous variables and attributes, for example, the amount of solar irradiation falling on the solar panel arrays 130, the solar panel temperatures, and/or inverter efficiencies. As such, in order to maintain or set a target regulation range and curtailment performance, an APP is estimated and communicated to the system operator 104 for market participation. As such, accurate estimation of APP is required for reliable Automatic Generation Control (AGC) and ancillary services. In this case, the controller 120 is configured to follow a set point signal received from the system operator 104 periodically. The set point is adjusted at every dispatch cycle based on the estimation of the APP to maintain target regulation headroom. In the illustrative embodiment, the APP is estimated using the system performance model 200 to provide the accuracy of the APP estimation based on the variables and attributes measured in real-time. The APP is used to optimize the power transfer efficiency from the power plant 102.

The power controller 120 may be embodied as any type of device capable of performing the functions described herein. In the illustrative embodiment, the power controller 120 is configured to periodically or continually update or tune the system performance model 200 based on the real-time measurements. To do so, the power controller 120 includes an error processor 122. The power system performance model tuning may include modifying a set of independent variables being used for the predictions and/or changing model execution parameters to find the best model descriptors that capture the observed behavior and performance in data. In some embodiments, default parameters of the system performance model may be obtained from manufacturer's specification sheets, and the accuracy of the model may be further refined using measurements from well-instrumented field measurements in operational systems. The power controller 120 may utilize the default parameters to initially train the system performance model. Over time, the power controller 120 is configured to adjust the model parameters to reflect natural plant aging. It should be appreciated that, in some embodiments, the power controller 120 may be embodied as part of DAC converter 140 or the system operator 104. In other embodiments, the power controller 120 may be embodied as a server device (e.g., a cloud server or an edge gateway device) that is communicatively coupled to the network 106. Additionally, the power controller 120 is configured to dynamically control performance of the DAC converter 140 based on the system performance model.

The error processor 122 may be embodied as any type of processor capable of performing the functions described herein. For example, the error processor 122 may be embodied as a single or multi-core processor(s), digital signal processor, microcontroller, or other processor or processing/controlling circuit. In the illustrative embodiment, the error processor 122 is configured to process error signals (e.g., an error signal that is generated when a measured output is different from an expected output of the power plant 102) to adjust the system performance model. For example, by tuning the model and tracing performance issues related to the inverter 140 and array 130, the system performance model is configured to maintain required precision and accuracy for peak power estimation.

In some embodiments, the power plant 102 may include a storage 150 that is configured to store excess energy generated by the solar panel array(s) 120. For example, the storage 150 may be embodied as a battery that is charged during the day and may be used during the night to provide power to loads connected to the power plant 102. It should be appreciated that, in such embodiments, the storage capability may be leveraged in the provision of the PV plant for grid services.

As described above, the system operator 104 and the power plant 102 are illustratively in communication via the network 106, which may be embodied as any type of wired or wireless communication network, including, for example, global networks (e.g., the Internet), local area networks (LANs) or wide area networks (WANs), cellular networks (e.g., Global System for Mobile Communications (GSM), 4G, 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

In the illustrative embodiment, the power controller 120 is configured to measure and analyze the power production of the specific grid-connected photovoltaic (PV) system 100 using the power system performance model 200 to evaluate the quality of the PV system performance. The power system performance model 200 may be used for operational planning and calculation of a wide range of Key Performance Indicators (KPIs) that characterize and track the performance of the power plants 102. For example, power and Energy Performance Indices (e.g., a power performance index (PPI), an energy performance index (EPI), a baseline power performance index (BPPI), and a baseline energy performance index (EPI)) are among the KPIs that can be applied for predictive maintenance, commissioning, and/or financial assessment of a solar site. In some embodiments, the modeling uncertainties may vary. In the illustrative embodiment, the power controller 120 is configured to evaluate the quality of the PV system performance using a system performance model to provide performance tracking and grid support applications.

Referring now to FIG. 2, the system performance model 200 for evaluating the quality of the power plant performance is shown. The system performance model 200 includes an array performance model 202, an inverter performance model 204, and a site compensation model 206. In the illustrative embodiment, system performance model maintenance and tuning may be achieved by decoupling the array performance from the inverter performance, utilizing real-time measurements, and including a feedback loop and the error processor 122 that is configured to differentiate modeling errors from excursions caused by performance issues. As discussed further below, only qualified modeling errors are used for model tuning.

Figure 3:
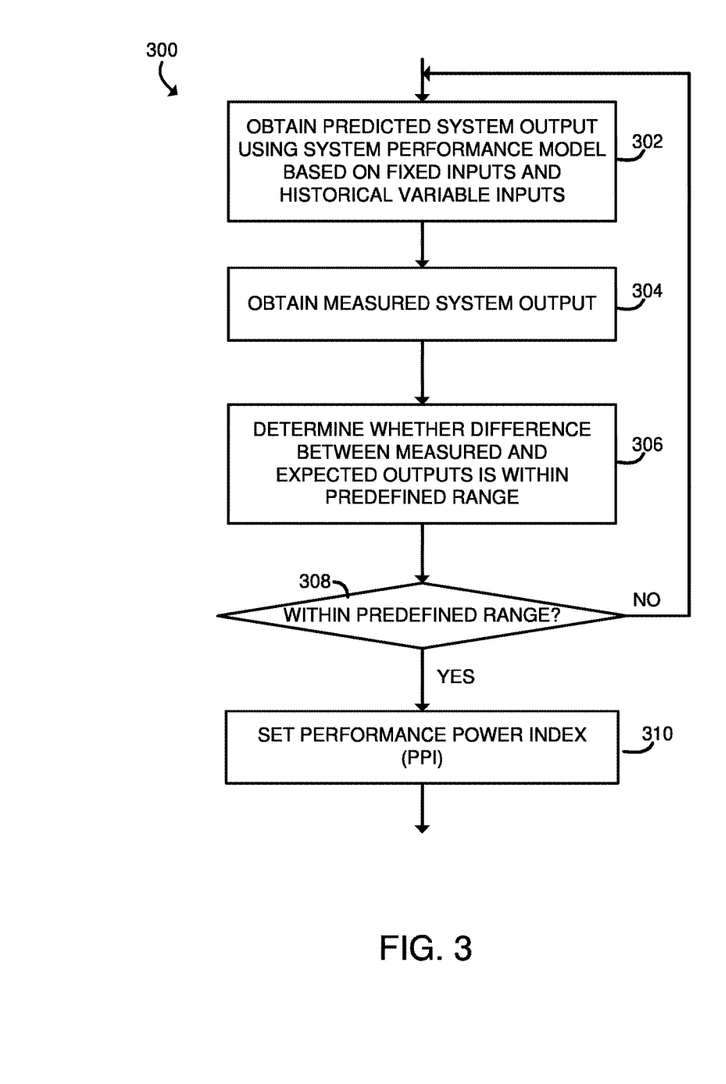
FIG. 3 is a simplified block diagram of at least one embodiment of determining a power performance index (PPI) using the system performance model of FIG. 2.

Referring now to FIG. 3, the power controller 120 may execute a method 300 for determining a performance power index (PPI) using the system performance model 200 based on fixed inputs, historical variable inputs, and measured output. The method 300 begins with block 302, in which the power controller 120 obtains a predicted system output using the system performance model 200 based on fixed inputs and historical variable inputs. In block 304, the power controller 120 obtains a measured system output. Subsequently, in block 306, the power controller 120 determines whether a difference between a measured system output and expected system output is within a predefined range. If the power controller 120 determines that the difference is within the predefined range in block 308, the method 300 advances to block 310 to set or update a performance power index (PPI). However, if the power controller 120 determines that the difference is not within the predefined range, the method 300 loops back to block 302.

Figure 4:
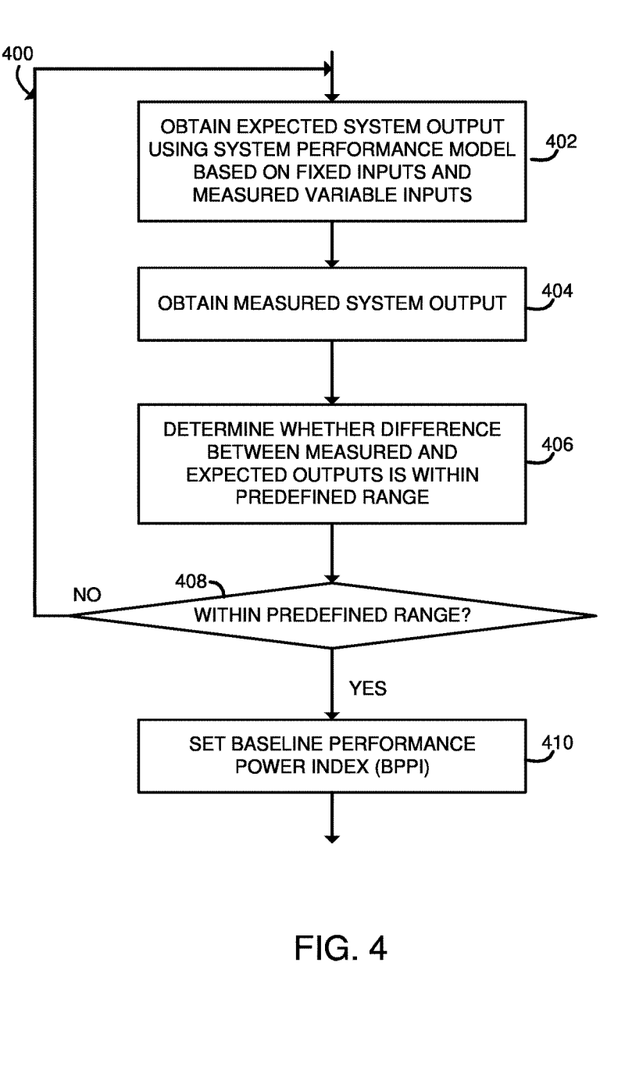
FIG. 4 is a simplified block diagram of at least one embodiment of determining a baseline power performance index (BPPI) using the system performance model of FIG. 2.

Referring now to FIG. 4, the power controller 120 may execute a method 400 for determining a baseline performance power index (BPPI) using the system performance model 200. The method 400 begins with block 402, in which the power controller 120 obtains a predicted system output using the system performance model 200 based on fixed inputs and measured variable inputs. In block 404, the power controller 120 obtains a measured system output. Subsequently, in block 406, the power controller 120 determines whether a difference between a measured system output and expected system output is within a predefined range. If the power controller 120 determines that the difference is within the predefined range in block 408, the method 400 advances to block 410 to set or update a baseline performance power index (BPPI). However, if the power controller 120 determines that the difference is not within the predefined range, the method 400 loops back to block 402.

Referring back to FIG. 2, by decoupling the array performance from the inverter performance in the model 200, an impact of meteorological parameters and array conditions estimation error may be isolated and allow for characterization and traceability of a significant source of uncertainty in the estimation process. When in the MPPT mode, these variables are incorporated in the estimation method by taking a real-time measurement of DC inputs of the DAC inverter 140. However, as discussed above, when inverter is following the commanded set points received from the system operator 104, it may not be at the maximum power point (i.e., non-MPPT mode). In such case, the real-time inputs to the inverter production model 204 are the estimated output values generated by the array production model 202.

Figure 5:
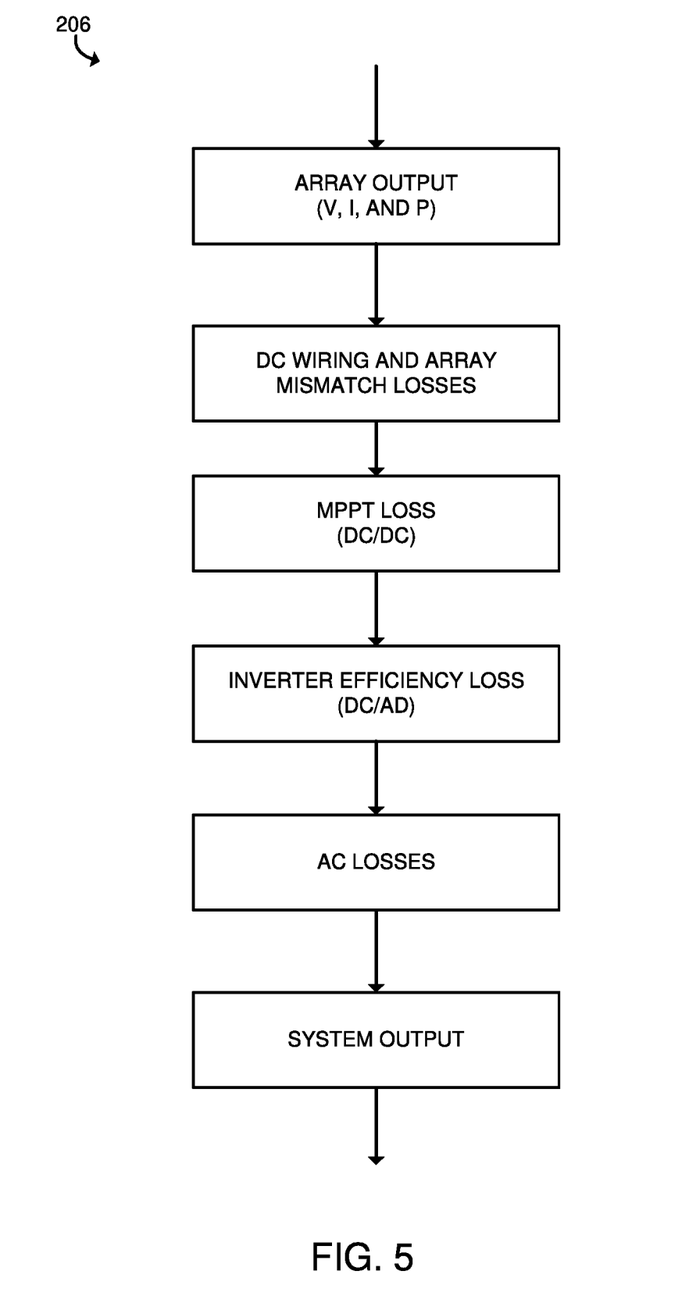
FIG. 5 is a simplified block diagram illustrating a loss model for the power plant of FIG. 1 that may be compensated using a site compensation model of the system performance model of FIG. 2.

It should be appreciated that an output (i.e., AC power) of the DAC converter 140 may not be the system output with respect to the power exported to the grid. Accordingly, the site compensation model 206 is configured to determine and compensate losses and local consumption, which may be included in engineering tolerances. For example, AC losses for utility scale plants may be significant when the AC power is transferred over a distance before reaching a utility meter. As illustrated in FIG. 5, there are additional loss elements and possibly local loads and storage that can be included in the site compensation model 206. When the DAC converter 140 is in the MPPT mode, these losses can be directly estimated in near real-time and factored in the peak power estimation by applying a non-negative least squares method. In some embodiments, the site compensation model 206 may be realized as a multiplicative or additive factor in its simplest form.

Figure 6:
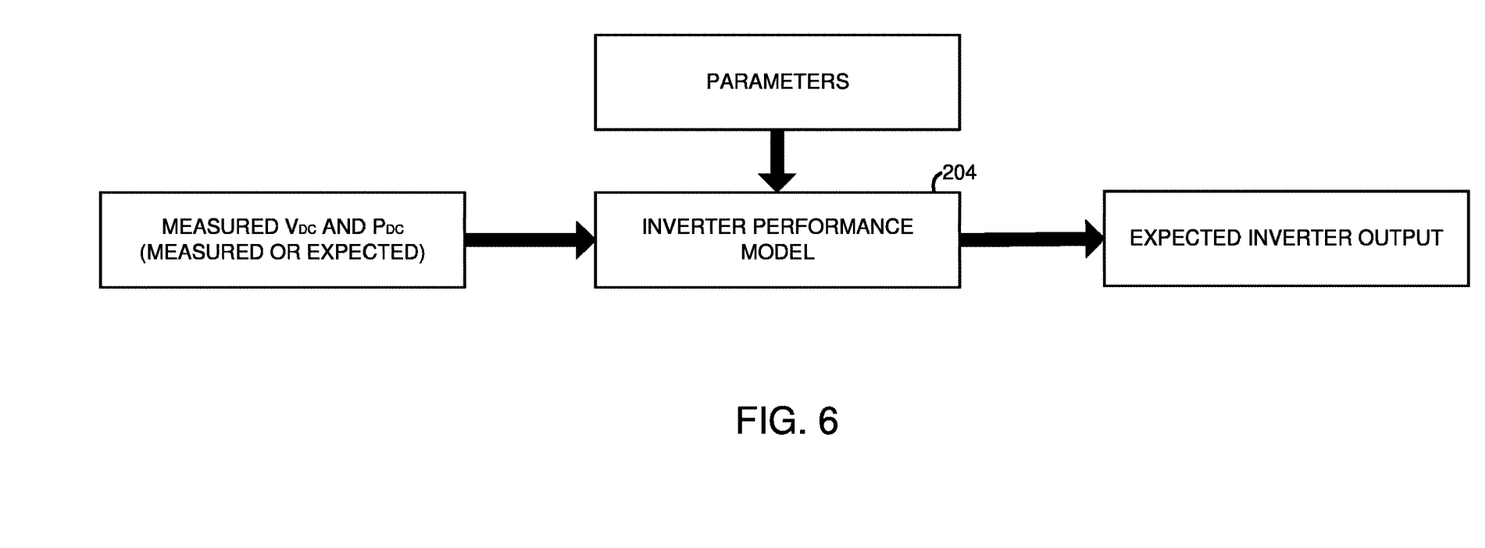
FIG. 6 is a simplified block diagram of at least one embodiment of an inverter performance model of the system performance model of FIG. 2.

Referring now to FIG. 6, the inverter performance model 204, which relates an inverter's DC inputs to its expected AC output under a nominal configuration, is used to account for inverter efficiency. Inverter efficiency is defined as the ratio of AC output power to DC input power and varies with AC output power, DC voltage, and/or inverter temperature as shown in equation (1).

$$P_{AC}(t) = f(P_{DC}(t), V_{DC}(t), T(t), \text{params}) \quad (1)$$

It should be noted that the expected output of the inverter 140 determined using the inverter performance model 204 is a real-time estimation of inverter output based on measured (in MPPT mode) or estimated (in non-MPPT mode) inputs ($V_{DC}$ and $P_{DC}$ or $I_{DC}$). In other words, unlike a forecast output that is based on historical measurements, the estimated output is based on the real-time measurements or estimations of input variables. If high accuracy forecasted values are available, the output is the forecasted output, which is still valuable for production scheduling for day-ahead or longer market participation. It should be appreciated that, in the illustrative embodiment, historical measurements may be used to train machine learning models for model tuning and maintenance.

The expected power supplied by the inverter performance model 204 at time t under the MPPT mode is the available peak power (APP) for that instance which should closely match the measured output power of the inverter 140. On the other hand, the expected power calculated from the inverter production model 204 at time t under the commanded or non-MPPT mode is the available peak power with respect to the inverter output for that instance. As described above, the inverter may not operate the array near the MPP point in the commanded or non-MPPT mode, and the maximum DC power from the array is unknown. However, direct measurement of the maximum power can only be done if the inverter is disconnected from the panel, which is practically not feasible online. As such, the maximum APP is estimated from the current-voltage (I-V) curve.

Figure 7:
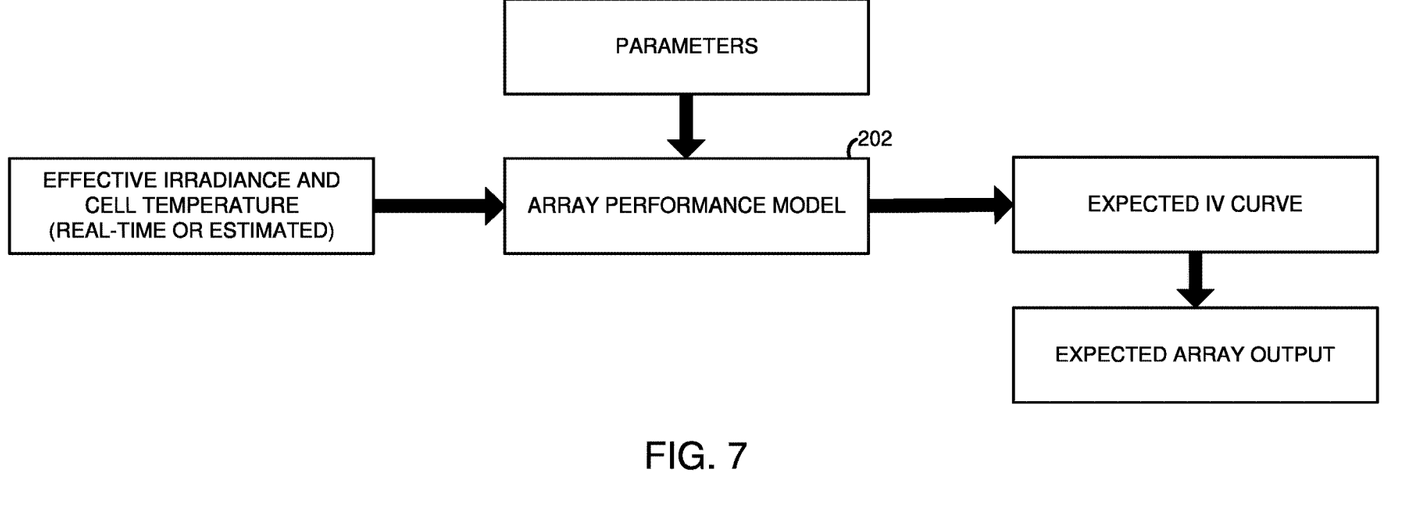
FIG. 7 is a simplified block diagram of at least one embodiment of an array performance model of the system performance model of FIG. 2.

Referring now to FIG. 7, the array performance model 202 may be any validated model that relates solar irradiance to expected power output. Acting as a "digital twin," it may be expressed in an analytical form (stateless model) or derived from a machine leaning exercise using regression, neural network, or other techniques. In general, the model may follow the general mathematical relationship below.

$$(I_{module}, V_{module}) = f(E_e, T, \text{params}) \quad (2)$$

$$P_{module} = V_{module} * I_{module} \quad (3)$$

Figure 8:
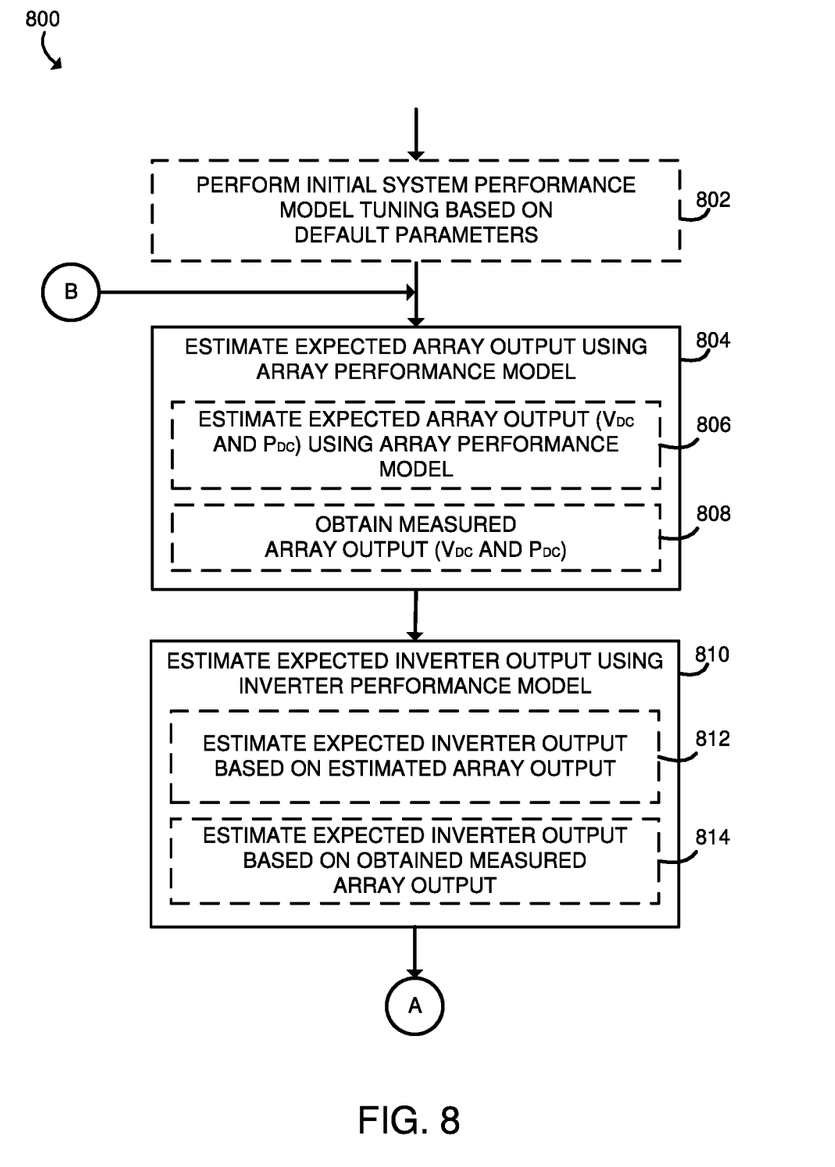
FIGS. 8 and 9 are a simplified flow diagram of at least one embodiment of a method for updating the system performance model that may be executed by a power controller of the power plant of FIG. 1.
Figure 9:
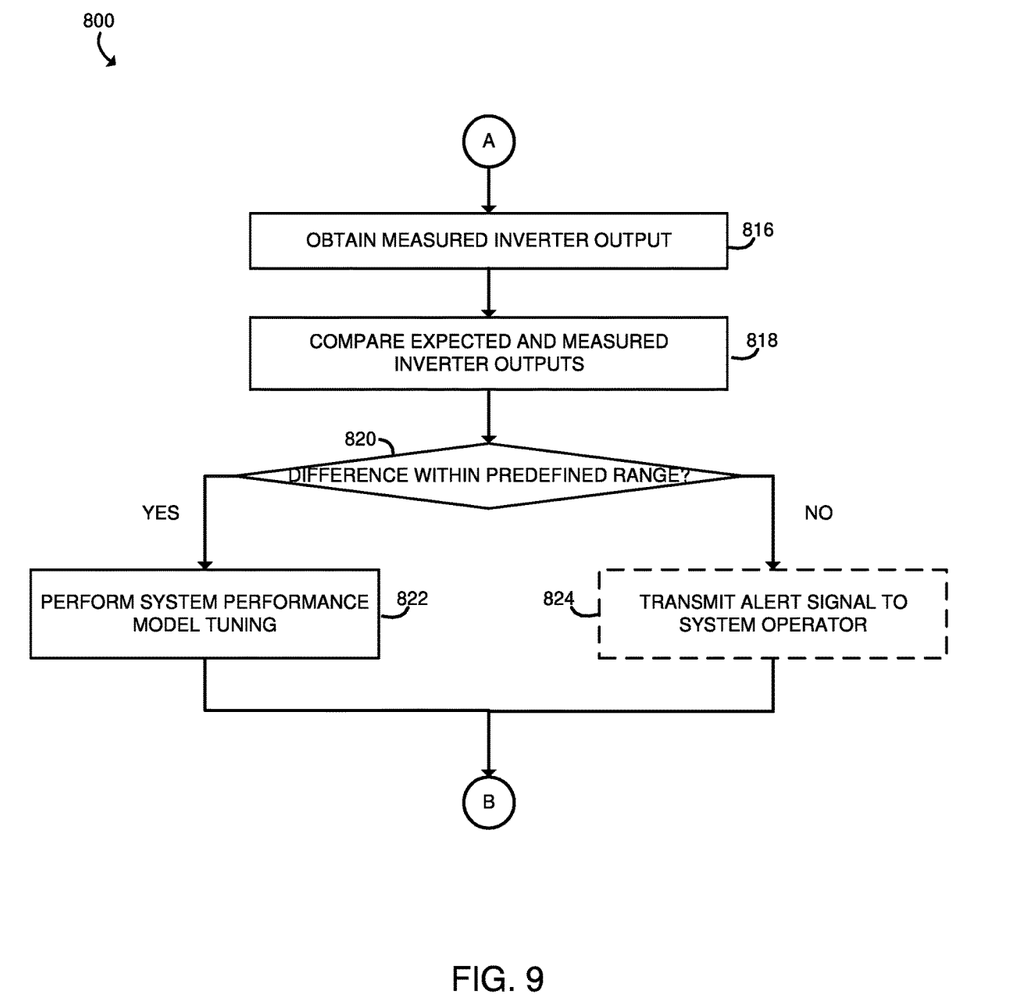

Referring now to FIGS. 8 and 9, in use, the power controller 120 may execute a method 800 for tuning the system performance model 200 to compensate for model degradation over time and incrementally adjust model parameters to represent the actual performance characteristics of the site. As discussed above, the power controller 120 may initially train the system performance model 200 based on the default parameters. Over time, the power controller 120 is configured to adjust the model parameters to reflect natural plant aging. As such, in some embodiments, the method 800 may begin with block 802, in which the power controller 120 performs initial tuning of the system performance model 200 (i.e., the array performance model 202, the inverter performance model 204, the site compensation model 206) based on the default parameters.

In block 804, the power controller 120 obtains an expected array output (e.g., $V_{DC}$ and $P_{DC}$). To do so, in some embodiments, the power controller 120 may estimate an expected array output using the array performance model 202 as illustrated in block 806. For example, if the inverter 140 is in the non-MPPT mode, the output of the inverter 140 is curtailed based on commanded set points (e.g., an expected array output) received from the system operator 104 to provide the necessary headroom from reliability services. In such a case, the power controller 120 estimates the expected array output using the array performance model 202. In other embodiments, as illustrated in block 808, the power controller 120 may obtain a measured array output. For example, if the inverter 140 is in the MPPT mode, the inverter 140 is adapted to generate a maximum output. In such case, the actual array output may be used as the expected array output.

In block 810, the power controller 120 estimates an expected inverter output using the inverter performance model 204. To do so, in some embodiments, the power controller 120 may estimate the expected inverter output based on the estimated array output (from block 806), as illustrated in block 812. For example, blocks 806 and 812 may be utilized when the inverter 140 operates in a non-MPPT mode. In other embodiments, the power controller 120 may estimate expected inverter output based on the obtained measured array output (from block 808), as illustrated in block 814. For example, blocks 808 and 814 may be utilized when the inverter 140 operates in the MPPT mode.

In block 816 shown in FIG. 9, the power controller 120 obtains a measured inverter output. Subsequently, in block 818, the power controller 120 compares the expected inverter output and the measured inverter output and determines a difference between the inverter output values.

In block 820, the power controller 120 determines whether the difference between the expected and measured inverter outputs is within a predefined range. If the power controller 120 determines that the difference is within the predefined range, the power controller 120 determines that the system performance model 200 is outdated and the method 800 advances to block 822 to perform system performance model tuning. In other words, if the difference is within an acceptable range, an error signal is generated and is processed by the error processor 122 of the power controller 120 to smooth out the raw error signal (e.g. moving average) and mitigate the effect of noise, jitter, and other artifacts. It should be appreciated that the error processor 122 may check an operational mode, operational constraints, internal protections, grid stability and power quality, diagnostics, time sync, sensor integrity, cyber security, and/or system descriptions based on the error signal and supplemental data for adjusting the system performance model 200 for model tuning and performance tracking and diagnostics. By doing so, an error variance and/or bias is reduced such that systematic changes in the inverter performance are reflected in the updated system performance model 200. In some embodiments, the power controller 120 may cross-compare system performance models with other inverters from the same site or same class to update the system performance model 200. The method 800 then loops back to block 804 to continue tuning the system performance model 200 based on real-time field measurements.

If, however, the power controller 120 determines that the difference is not within the predefined range in block 820, the power controller 120 may advance to block 824 in some embodiments. In block 824, the power controller 120 may transmit an alert signal to the system operator 104. In other words, if the difference or error is not within an acceptable range, the error processor 122 may determine that the error is due to factors that the inverter 140 cannot control or influence (e.g., weather). In such case, the error signal is not treated as a qualified input for adjusting the system performance model 200. Additionally, in some embodiments, the power controller 120 may activate real-time diagnostic analysis and a diagnostic result may be transmitted to the system operator 104. The method 800 then loops back to block 804 to continue tuning the system performance model 200 based on real-time field measurements.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There exist a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

What is claimed is:

1. A method of tuning a system performance model for a power plant, the power plant comprising at least one solar panel array, an inverter electrically coupled to the at least one solar panel array, and a power controller including an error processor, the method comprising:
   training the system performance model using default parameters;
   estimating an expected output of the inverter using the system performance model;
   obtaining a measured output of the inverter;
   calculating, by the power controller, a difference between the expected output of the inverter and the measured output of the inverter;
   determining, by the error processor, whether the difference represents a modeling error or a performance issue; and
   in response to determining that the difference represents the modeling error, tuning the system performance model using the difference for subsequent use of the system performance model for estimating the expected output of the inverter.

2. The method of claim 1, wherein the system performance model for the power plant comprises (i) an array performance model characterizing the at least one solar panel array and (ii) an inverter performance model characterizing the inverter.

3. The method of claim 2, wherein estimating the expected output of the inverter using the system performance model comprises estimating the expected output of the inverter using the inverter performance model.

4. The method of claim 3, further comprising estimating an expected output of the at least one solar panel array using the array performance model.

5. The method of claim 4, wherein estimating the expected output of the inverter comprises estimating the expected output of the inverter using the expected output of the at least one solar panel array as an input to the inverter performance model.

6. The method of claim 5, wherein the steps of estimating the expected outputs of the at least one solar panel array and of the inverter are performed in response to determining that the inverter is not operating in a maximum power point tracking (MPPT) mode.

7. The method of claim 3, further comprising obtaining a measured output of the at least one solar panel array.

8. The method of claim 7, wherein estimating the expected output of the inverter comprises estimating the expected output of the inverter using the measured output of the at least one solar panel array as an input to the inverter performance model.

9. The method of claim 8, wherein the steps of obtaining the measured output of the at least one solar panel array and estimating the expected output of the inverter are performed in response to determining that the inverter is operating in a maximum power point tracking (MPPT) mode.

10. The method of claim 9, wherein the measured output of the at least one solar panel array is obtained in real-time without taking the at least one solar panel array off-line.

11. The method of claim 2, wherein the array performance model is a validated model that relates solar irradiance to expected power output of the at least one solar panel array.

12. The method of claim 2, wherein the inverter performance model relates direct current (DC) inputs of the inverter to expected alternating current (AC) outputs of the inverter.

13. The method of claim 1, wherein the measured output of the inverter is obtained in real-time and without taking the inverter off-line.

14. The method of claim 1, further comprising tuning the system performance model using default parameters prior to obtaining any measured output.

15. The method of claim 1, wherein the system performance model for the power plant further comprises a site compensation model characterizing local losses associated with the power plant.

16. The method of claim 1, wherein the difference between the expected output of the inverter and the measured output of the inverter is smoothed prior to being used to tune the system performance model.

17. The method of claim 1, wherein tuning the system performance model comprises comparing the system performance model for the power plant to another system performance model for another power plant.

18. The method of claim 1, wherein tuning the system performance model compensates for degradation of the system performance model over time and incrementally adjusts parameters of the system performance model to represent actual performance characteristics of the power plant.

19. The method of claim 1, wherein tuning the system performance model comprises updating a Key Performance Indicator (KPI) for the power plant.

20. The method of claim 19, wherein the KPI is at least one of a power performance index (PPI), an energy performance index (EPI), a baseline power performance index (BPPI), and a baseline energy performance index (EPI).

21. The method of claim 1, further comprising transmitting an alert signal to a system operator in response to determining that the difference is not within a predefined range.

22. One or more non-transitory computer-readable media storing a plurality of instructions that, when executed by a power controller operatively connected to (i) the at least one solar panel array and (ii) the inverter electrically coupled to the at least one solar panel array, cause the power controller to perform the method of claim 1.

23. A power controller to be operatively connected to (i) at least one solar panel array and (ii) an inverter electrically coupled to the at least one solar panel array, the power controller including an error processor and configured to:
   train the system performance model using default parameters;
   estimate an expected output of the inverter using a system performance model comprising (i) an array performance model characterizing the at least one solar panel array and (ii) an inverter performance model characterizing the inverter;
   obtain a measured output of the inverter;
   calculate, by the power controller, a difference between the expected output of the inverter and the measured output of the inverter;
   determine, by the error processor, whether the difference represents a modeling error or a performance issue; and
   in response to determining that the difference represents the modeling error, tune the system performance model using the difference for subsequent use of the system performance model to estimate the expected output of the inverter.

24. A power plant comprising:
   at least one solar panel array;
   an inverter electrically coupled to the at least one solar panel array; and a power controller operatively connected to the at least one solar panel array and to the inverter, the power controller including an error processor and configured to:
train the system performance model using default parameters;
estimate an expected output of the inverter using a system performance model for the power plant;
obtain a measured output of the inverter;
calculate, by the power controller, a difference between the expected output of the inverter and the measured output of the inverter;
determine, by the error processor, whether the difference represents a modeling error or a performance issue; and
in response to determining that the difference represents the modeling error, tune the system performance model using the difference for subsequent use of the system performance model to estimate the expected output of the inverter.

* * * * *